United States Patent [19]

Collin

[11] 4,042,376

[45] Aug. 16, 1977

[54] METHOD FOR CARRYING OUT ENDOTHERMIC REDUCTION PROCESSES IN A CIRCULATING FLUID BED AND AN APPARATUS THEREFOR

[75] Inventor: Per Harald Collin, Falun, Sweden

[73] Assignee: Stora Kopparbergs Bergslags Aktiebolag, Falun, Sweden

[21] Appl. No.: 650,882

[22] Filed: Jan. 21, 1976

[30] Foreign Application Priority Data

Jan. 24, 1975 Sweden .............................. 75007971

[51] Int. Cl.² ............................................. C22B 1/10
[52] U.S. Cl. ...................................................... 75/26
[58] Field of Search ............................................ 75/26

[56] References Cited

U.S. PATENT DOCUMENTS

| 3,475,160 | 10/1969 | Heinzelmann | 75/26 |
| 3,511,642 | 5/1970 | Etherington | 75/26 |
| 3,936,296 | 2/1976 | Campbell | 75/26 |

*Primary Examiner*—Peter D. Rosenberg
*Attorney, Agent, or Firm*—Curtis, Morris & Safford

[57] ABSTRACT

A method for endothermic reduction of solid materials in a circulating fluid bed comprising a vertically elongated reaction zone of intermediate and lower sections separated by a transport zone, wherein due to high gas velocity therein essentially all materials entering the transport zone are transported from the lower to the intermediate section; an apparatus for carrying out such method is also disclosed.

3 Claims, 1 Drawing Figure

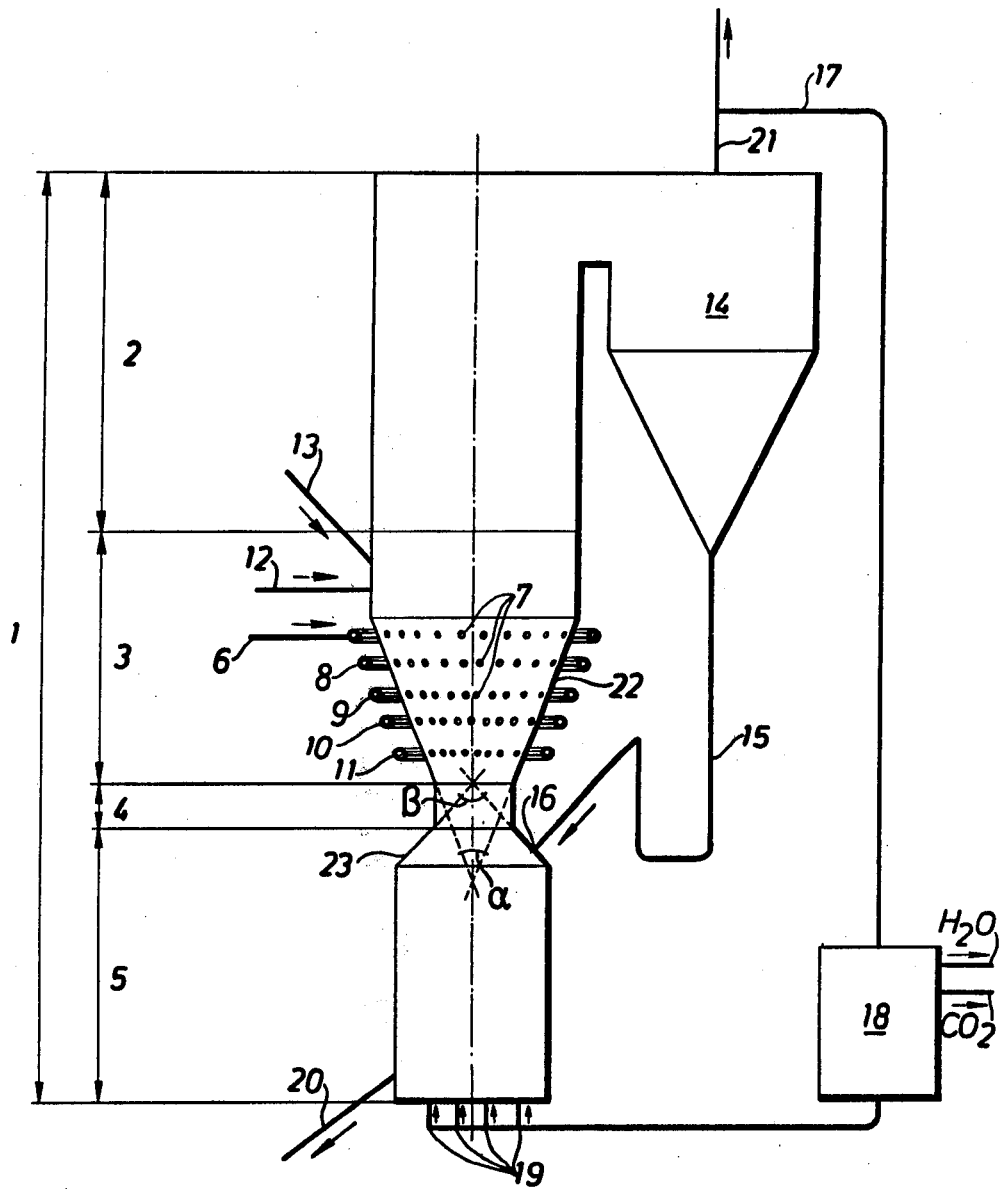

4,042,376

METHOD FOR CARRYING OUT ENDOTHERMIC REDUCTION PROCESSES IN A CIRCULATING FLUID BED AND AN APPARATUS THEREFOR

It is previously known, for instance from Swedish patent application No. 7403145-1 (corresponding to U.S. patent application Ser. No. 610,391) and Belgian Pat. No. 826,521 to carry out endothermic reduction processes in so-called fast or circulating fluid beds. With regard to the relations prevailing between material parameters, gas velocity etc. in order to obtain a circulating fluid bed, please refer to L. Reh, Chem. Eng, Progr. Vol. 67, No. 2, 1971, pp. 58–63.

The method according to the above-identified patent application is characterized by maintaining the circulating fluid bed in a vertically elongated reaction zone by supplying to the intermediate section of the zone controlled streams of finely divided oxidic materials, finely divided solid and possibly liquid carbonaceous materials and a gas containing molecular oxygen, wherein gas and solid material leaving the upper section of the reaction zone are separated, the solid materials being recirculated to the intermediate section and a partial stream of the gas, after dust precipitation and elimination of the major part of its content of $CO_2$ and $H_2O$, is introduced as a fluidizing and reducing gas in the lower section of the reaction zone, and wholly or partly reduced materials being discharged from said lower section.

In the method according to said patent application the elevational difference (separation distance) between the levels for feeding and discharging, respectively, of solid material must be relatively large in order that a high degree of reduction shall be obtained. The reason for this is the intense internal circulation of material in a bed of the circulating type, which at small elevational differences result in excessive reoxidation of reduced material in the combustion zone and an insufficient retention time for some of the oxidic material in the reduction zone. These phenomena are in the following summarized by the expression "back mixing effect."

The object of the present invention is to substantially reduce said back mixing effect, which results in a substantial increase of production per unit of volume of the reaction zone.

The method according to this invention is characterized by such an adapted velocity increase of the fluidizing gas in the transition zone between the lower section and the intermediate section of the reaction zone and its lower section that the solid material in said transition zone is moved essentially upwardly. This means that the material in this zone does not circulate within the zone but is transported through the zone thus reducing the back mixing effect. The said transition zone is therefore in the following referred to as the "transport zone."

Heat transfer from the intermediate section, wherein the partial combustion takes place, to the lower section of the reaction zone is prevented by the transport zone. In order to satisfy the heat requirement of the lower zone, solid material is separated from the mixture of gas and solid material leaving the upper section of the reaction zone and said solid material is returned in one or several partial streams to the lower section of the reaction zone, preferably adjacent the transport zone.

The invention also comprises an apparatus for carrying out the process defined above, and said apparatus is characterized as in the appended claims herein.

The invention will be more particularly described below in connection with the drawing herein illustrating endothermic reduction in a circulating fluid bed in accordance with the described method and showing an apparatus as described herein.

The vertically elongated reaction zone 1 can be considered as comprising the following sections: an upper section 2 for pre-reduction, an intermediate section 3 for introduction of raw materials and for heat generation, a transport zone 4; the function of which is explained below, and a lower section 5 for further reduction. The desired increase of the velocity of the fluidizing gas is provided by making the cross-sectional area of the transport zone considerably smaller than that of the lower section of the reaction zone. In practice, it has been found suitable to increase the gas velocity in the transport zone by a factor 2 and 6, preferably 3 to 5, as compared to the velocity in the lower section of the reaction zone. Such velocity increase means that essentially all materials entering the transport zone will pass this zone without internal circulation into the intermediate section of the reation zone.

In order to avoid local overheating when introducing the gas 6 containing molecular oxygen in the intermediate section 3 and in order to provide for a favourable distribution of same, the gas supply is subdivided into a number of smaller partial streams 7 at a plurality of separate levels 8 to 11 of the conical portion 22 forming the lower portion of the intermediate section 3 adjacent the transport zone 4. In practice, it has been found that a top angle $\alpha \leqq 45°$ of said connecting part provides a good gas distribution and a low pressure drop.

Carbonaceous material 12 and oxidic material 13 are also supplied to the intermediate section of the reaction zone, preferably at its upper part. Gas and solid materials leaving the upper part 2 of the reaction zone at the top thereof are subjected to separation 14, separated solid materials being returned 15 to the lower section, suitably by introduction at 16 of the conical portion 23 forming the upper part of the lower section 5 adjacent the transport zone. The top angle $\beta$ of said conical portion is suitably about 90°.

A partial stream 17 of the gases 21 from the separation 14 is in a known manner freed at 18 from the major part of its content $CO_2$ and $H_2O$ and introduced as a reduction gas by suitable distributing means 19 into the bottom part of the lower section. Reduced material is discharged at 20 from said bottom part.

What is claimed is:
1. A method for carrying out endothermic reduction of a finely divided reducible solid material in a circulating fluid bed, comprising,
    maintaining fluidization of said solid material in a vertically elongated reaction zone, said vertically elongated zone comprising an upper zone, an intermediate zone, a transport zone and a lower zone, the intermediate and lower zones of which are separated by said transport zone, wherein a gas velocity in said transport zone is so high as to transport essentially all materials entering said transport zone from the lower to the intermediate zone,
    generating the heat necessary for the endothermic reduction process in the intermediate zone by partial combustion therein, with molecular oxygen, oxidic and carbonaceous materials, said oxidic and carbonaceous materials also being introduced into said intermediate zone, transferring part of heat generated by the partial combustion in said intermediate zone to the lower zone of the verticaly elongated reaction zone by withdrawing gases and solid material from said upper zone and separating gases from solid material, the solid material being introduced in the lower zone, after dust precipitation and elimination of the major part of $H_2O$ and $CO_2$, utilizing a partial stream of said gases which were separated for the purpose of fluidization and reduction, in the lower zone of the reaction zone, said solid material introduced therein, and discharging a reduced material preferably from the bottom part of said lower zone.

2. An apparatus for endothermic reduction of finely divided solid materials in a circulating fluid bed, comprising a vertically elongated reaction vessel of an upper section, an intermediate section, a narrow section as a transport section of said vessel and a lower section, the upper part of the upper section being connected to a separating means which is connected to the lower section through a means for transporting separated solid materials, said intermediate section including in its upper part thereof an inlet means for raw materials for said endothermic reduction and nozzle means for gas containing molecular oxygen, said lower section including nozzle means for introducing reduction gas in the bottom part of said lower section and a discharge means for removing endothermically reduced materials therefrom.

3. An apparatus as defined in claim 2, comprising an intermediate section conically tapered towards said transport section.

* * * * *